(No Model.) 2 Sheets—Sheet 1.
L. S. HARRIS.
REGULATOR FOR ELECTRIC MOTORS.

No. 446,229. Patented Feb. 10, 1891.

WITNESSES
F. Clough.
Adolph Stanzburg

INVENTOR
Lander S. Harris
By Wells W. Leggett & Co.
Attorneys.

(No Model.) 2 Sheets—Sheet 2.

L. S. HARRIS.
REGULATOR FOR ELECTRIC MOTORS.

No. 446,229. Patented Feb. 10, 1891.

WITNESSES
W. Bradford
F. Clough.

INVENTOR
Lauder S. Harris
By Wells H. Leggett & Co.
Attorney.

UNITED STATES PATENT OFFICE.

LANDER S. HARRIS, OF DETROIT, MICHIGAN.

REGULATOR FOR ELECTRIC MOTORS.

SPECIFICATION forming part of Letters Patent No. 446,229, dated February 10, 1891.

Application filed August 30, 1890. Serial No. 363,508. (No model.)

*To all whom it may concern:*

Be it known that I, LANDER S. HARRIS, a citizen of the United States, residing at Detroit, county of Wayne, State of Michigan, have invented a certain new and useful Improvement in Electric Motors; and I declare the following to be a full, clear, and exact description of the invention, such as will enable others skilled in the art to which it pertains to make and use the same, reference being had to the accompanying drawings, which form a part of this specification.

Figure 1:
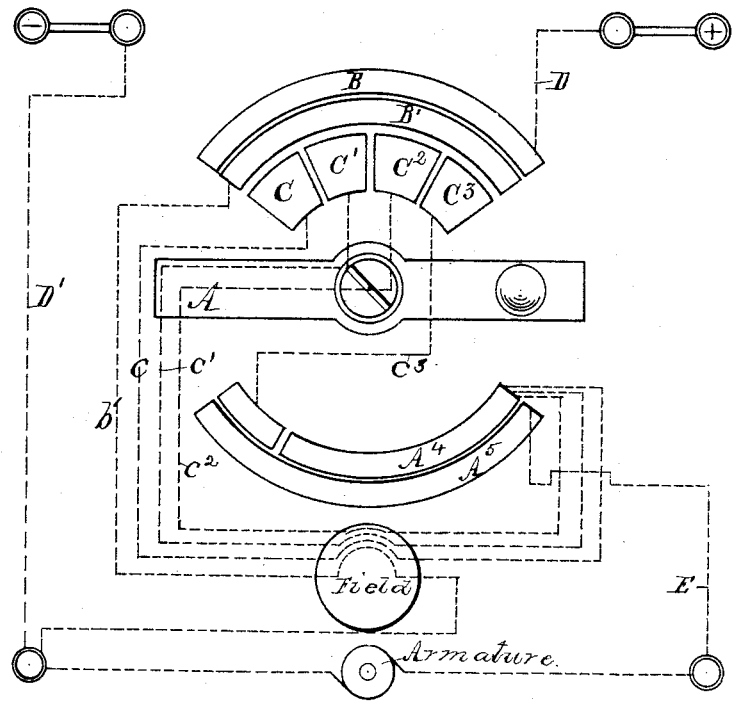
Figure 2:
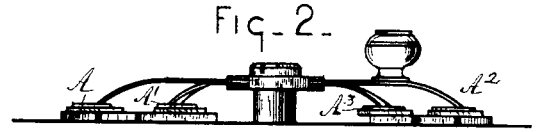
Figure 3:
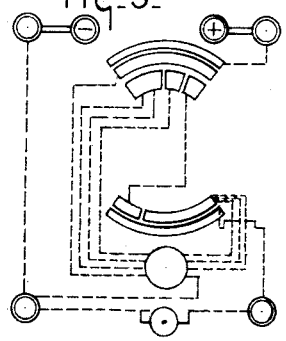
Figure 4:
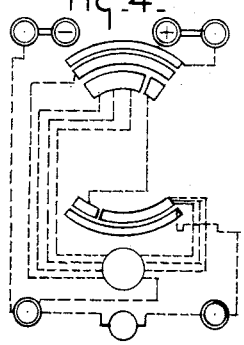
Figure 5:
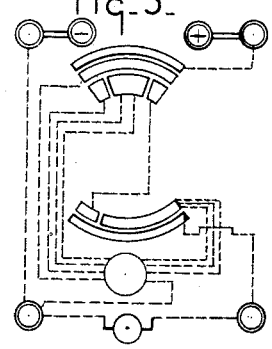
Figure 6:
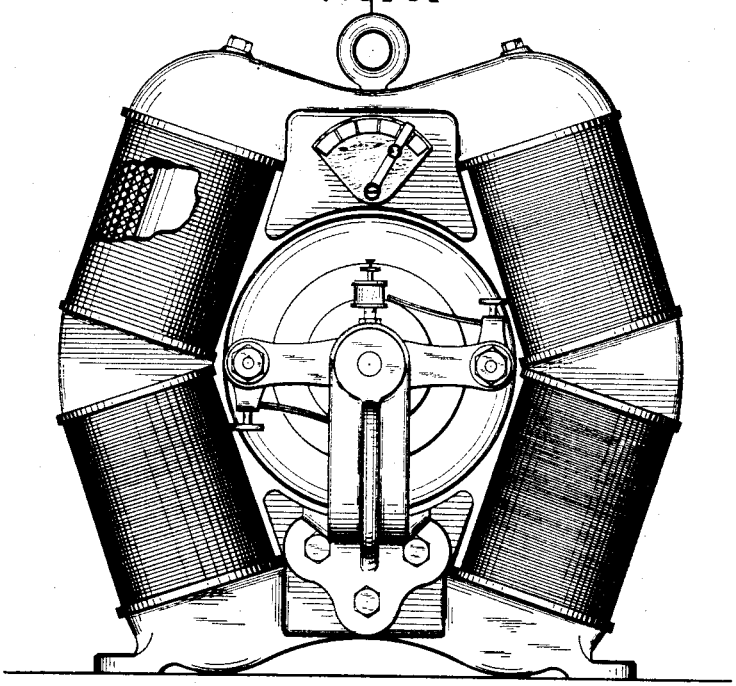
Figure 7:
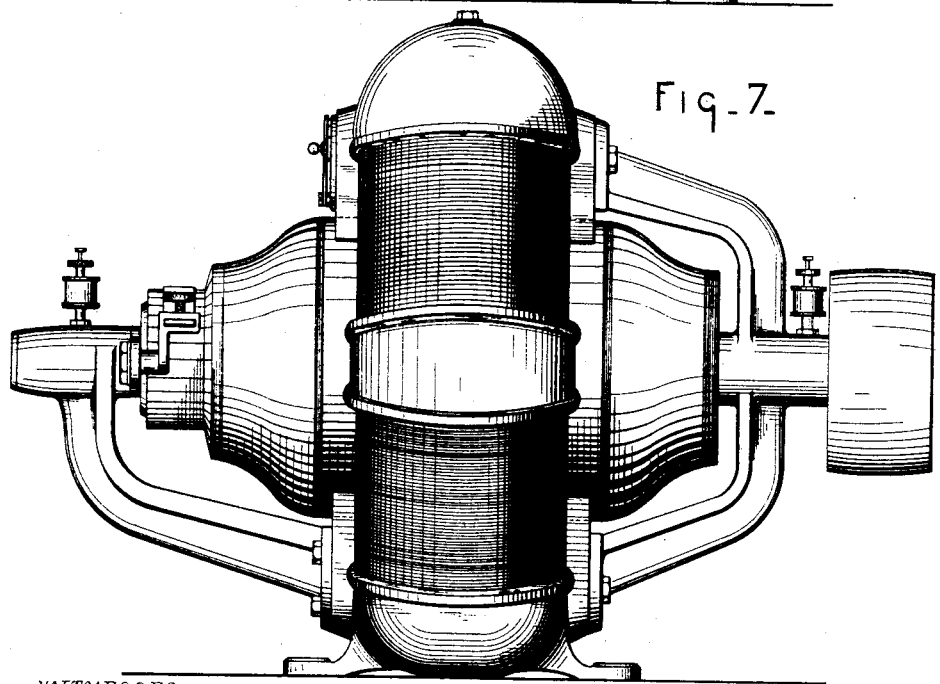

In the drawings, Figure 1 is a diagrammatic view illustrating a switch and showing the manipulation of the operative current in its passage through the machine. Fig. 2 is a side elevation of the same. Fig. 3 illustrates a variation in which the first two of the switch-terminals that direct current through the armature are united into one. Fig. 4 is a variation in which the first three of the said switch-terminals governing the admission of current into the armature are united together. Fig. 5 is a variation in which the second and third of the said terminals are united together. Fig. 6 is an end elevation of a motor embodying my invention. Fig. 7 is a side elevation of the same.

This device is designed as an improvement in the same line of invention as secured to me by Letters Patent No. 391,319, of October 16, 1888. In the device there patented the motor was designed as a series motor. The field-magnets were wound with several grades of wire—that is to say, coarse wire adjacent to the core, then finer grades, and with the finest grade outside. In the said machine the current was passed over the finest grade of wire, thus slightly energizing the motor, and its energy was built up by bringing into action successively the different grades of wire; but the entire current was obliged to pass in series through the said several grades of wire.

The machine which constitutes the subject-matter of my present invention is a shunt-machine designed for a constant-potential circuit—that is to say, utilizing so much of the current from the main line as may be caused to be shunted from the outgoing line through the machine to the return-line when connected between said leaders. I wind the field-magnets with the direct-current wire adjacent to the core—that is to say, the wire conveys current from the main line over the field-magnets alone and off again onto the main line. Then I wind different grades of wire on the said field-magnets and direct the current from each of them over the circuit of the armature and off on the line; but instead of winding them in series they are each wound in shunt-circuit, so that each will take from the main line a current corresponding with its own capacity and resistance. In this way the motor may be lightly energized to start the load, and energy accumulated gradually without liability of burning out the coils or short-circuiting within the machine.

In carrying out my invention A represents one arm of a suitable switch-lever, which serves to connect the segments B B', governing the admission of current from the main line through the field-magnets alone.

A' is another arm, which, in connection with the arms A and $A^2$, serves to govern the admission of current from the main line through B B' and the segments C, C', and $C^2$, through the field-magnets, and thence through the armature-circuit. It should be observed that the arm $A^3$ of the switch-lever does not act in connection with the segments $A^4$ and $A^5$, but is provided to connect the segments C, C', $C^2$, and $C^3$ no matter which end of the switch-lever may be in position upon the said segments.

D is the point from which the current enters the machine, and D' its point of departure.

E is the circuit of the armature.

$b'$, $c$, $c'$, $c^2$, and $c^3$ are the circuits leading from the corresponding terminals B', C, C', $C^2$, and $C^3$.

The operation of the device is as follows: We will suppose the switch-bar to stand, as shown in the drawings, off from the terminals. It is apparent that the current from the main line entering the terminal B finds the circuit broken between B and B', and the circuits over the field-magnets and the armature are also broken between the segments $A^4$ and $A^5$, and the machine is absolutely inert and no current enters it. Now when it is desired to start the machine the switch is turned so as to bring it upon the terminal C. It simultaneously rests upon the terminals B and B', while its other end connects the terminals $A^4$ and $A^5$. The wire $c$, leading from C, is of one grade. Current from the main line enters, passing through B, the arm A, and the terminal B', through the wire $b'$, which directs it about the field-magnets only, and thence off onto the line. At the same time current passing from D through the switch and the terminal C passes over the fine wire $c$ to the extent determined by the capacity and resistance of the said wire, and this is led over the field-magnets and back through $A^4$ and $A^5$, through the armature-circuit E, and off at D' to the line. This correspondingly energizes the motor, enabling it to start its load, but with a current sufficiently light to prevent any liability of burning or short-circuiting. The switch is then gradually turned and quickly bridges the space between the terminals C and C', when an additional current is shunted from the main line through the wire $c'$. This being of a different grade from the wire $c$ allows a stronger current to flow through these two wires about the field-magnets and over the armature-circuit. A further sweep of the lever as the machine speeds up brings the switch over the space separating the terminals C' and $C^2$. These two wires send a considerable larger current over the field-magnets and armature-circuits than was sent from the terminals C and C', while that from C is cut out, and that wire is not required to do constant service. With the switch in this position the machine has substantially its full current; but before the speed has come up to normal the further shifting of the switch causes it to bridge the space between the terminals $C^2$ and $C^3$, and the lever is shifted at once, onto the terminal $C^3$. In this position the current from $C^3$ is passed directly through $c^3$ over the armature-circuit, leaving the machine with its current passing over $b'$ through the field-magnets alone, and the armature alone supplied with current through the shunt-circuit $c^3$, while the circuits from $c$, $c'$, and $c^2$, leading over the field-magnets, are entirely cut out of action. Thus it appears that in addition to its normal current I have given to the field-magnets a gradual increase of energy, while I have correspondingly gradually fed the current to the armature-circuit, whereby the machine has been very highly energized for the purpose of starting, but is eventually left with simply the normal current through both the field-magnets and the armature, while all the finer grades of wire utilized in starting have been cut out from action and not compelled to sustain the current for any considerable period. So, also, each grade of wire has been permitted to carry a current proportioned to its capacity and resistance instead of requiring the current to pass in series through those wires brought into action. I prefer to make these graded wires of German silver in order to profit by its great resistance and so reduce the size and quantity of wire employed. So, also, instead of winding each field-magnet with all of the different grades of wire, I have found it desirable where there is a sufficient number of the field-magnets to employ one grade upon one field-magnet and another grade upon another field-magnet, and so on, employing a single grade on each of the separate field-magnets, although this arrangement is not absolutely essential, for each of the said magnets may be wound with its proportion of each of the grades of wire.

The grades of wire leading from the different terminals C C' $C^2$, &c., may be varied as may be deemed desirable. Thus, if the machine was designed to run with twenty-four ampères of current over its armature-circuit, I would arrange the wire $c$ to carry, say, ten ampères. Then the wire $c'$ I would arrange to carry, say, eight ampères, so that when the switch rested upon these two terminals there would be eighteen ampères. Then the wire $c^2$ I would arrange to carry, say, fourteen ampères, so that when the switch rests upon C' and $C^2$ the aggregate current deflected through the field-magnets and armature-circuit from these terminals would be twenty-two ampères. This would permit it to take easily the additional two ampères of current as the switch passes onto the terminal $C^3$. In special cases, where the work to be done is previously determined, any of the said terminals C, C', $C^2$, and $C^3$ might, if desired, be united with the adjacent terminal or terminals, as shown in the variations, Figs. 3, 4, and 5, in which case the order in which the current would enter the corresponding circuits and the quantity of current brought into action at any one time would be correspondingly varied, and so the machine be particularly adapted for the particular work that might be required of it.

What I claim is—

1. An electric motor for constant-potential circuits, having its field-magnets wound with a shunt-circuit over the field-magnets alone and its armature wound with another shunt-circuit over the armature alone, and in connection therewith independent circuits in parallel arc with each other, of different grades of wire, passing over the field-magnets and directing their current thence over the armature-circuit, with switch mechanism for bringing said latter shunt-circuits successively into and out of action as the machine is being started, substantially as described.

2. An electric motor for constant-potential circuits, said motor having its field-magnets provided with a shunt-circuit for the field-magnets alone and its armature provided with a shunt-circuit for the armature alone, and in connection therewith independent windings of different grades of wire upon the field-magnets and adapted to direct the currents thence over the armature-circuit, and in connection therewith switch mechanism adapted to first throw the current onto the first-named field-circuit, and while thus maintained throughout to direct the current successively through each of the independent windings, and finally cut out all said independent windings and leave the armature with current only through its first-named circuit, substantially as described.

3. An electric motor for constant-potential circuits, having its field-magnets provided, as described, with a direct shunt-circuit $b'$, also with the parallel-arc circuits $c$ $c'$ $c^2$, each in series with the armature-circuit and with the circuit $c^3$, adapted to complete a direct circuit through the armature after the parallel-arc circuits are cut out of action, and switch mechanism for governing the admission of current through said circuits, substantially as described.

4. An electric motor for constant-potential circuits, having its field-magnets provided with a direct shunt-circuit $b'$, the armature provided with a direct circuit $c^3$ E, and a series of graded wires $c$ $c'$ $c^2$, each constituting an independent circuit in parallel with the others over the field-magnets and in series with the armature-circuit, substantially as described.

In testimony whereof I sign this specification in the presence of two witnesses.

LANDER S. HARRIS.

Witnesses:
WELLS W. LEGGETT,
MARION A. REEVE.